United States Patent
Marshall et al.

[15] 3,658,142
[45] Apr. 25, 1972

[54] WHEEL LOAD SCALE

[72] Inventors: Kenneth N. Marshall, Santa Rosa; Linus G. Schwartz, Rohnert Park, both of Calif.

[73] Assignee: National Controls, Inc., Santa Rosa, Calif.

[22] Filed: Nov. 20, 1970

[21] Appl. No.: 91,237

[52] U.S. Cl. .......................... 177/208, 177/256, 177/DIG. 9
[51] Int. Cl. ..................................................G01g 5/04
[58] Field of Search................177/126, 134, 141, 208, 256, 177/258, DIG. 9, 184, 189, 255, 188

[56] References Cited

UNITED STATES PATENTS

| | | | |
|---|---|---|---|
| 3,465,838 | 9/1969 | Kienzle et al. | 177/256 |
| 3,371,731 | 3/1968 | Connors et al. | 177/47 |
| 1,844,080 | 2/1932 | Troll | 177/208 X |
| 3,512,595 | 5/1970 | Laimins | 177/255 X |
| 3,347,328 | 10/1967 | Schieser et al. | 177/229 |
| 3,464,509 | 9/1969 | Gray | 177/256 X |

FOREIGN PATENTS OR APPLICATIONS

| | | | |
|---|---|---|---|
| 231,116 | 3/1925 | Great Britain | 177/208 |
| 1,162,336 | 9/1958 | France | 177/256 |

*Primary Examiner*—Stephen J. Tomsky
*Assistant Examiner*—George H. Miller, Jr.
*Attorney*—Flehr, Hohbach, Test, Albritton & Herbert

[57] ABSTRACT

Wheel load scale having a one piece base and utilizing flexure pivot assemblies and a hydraulic load cell formed as an integral part of the base to provide a highly portable unit having a low profile and a high degree of accuracy.

10 Claims, 7 Drawing Figures

INVENTOR.
Kenneth N. Marshall
BY Linus G. Schwartz
Attorneys

WHEEL LOAD SCALE

BACKGROUND OF THE INVENTION

This invention pertains generally to weighing devices and more particularly to a wheel load scale.

Wheel load scales have heretofore been provided for determining the load transmitted to a traffic surface, such as a road, by one wheel of a vehicle such as a truck. These scales are generally constructed in the form of pit scales, with lever systems below the ground or traffic level. Such scales must be mounted in permanent installations, rather than being portable, and they commonly have conventional pivots and bearings throughout their lever systems. Pivots and bearings of this type are subject to wear which can impair the accuracy of the scale, and they require frequent maintenance and/or replacement.

Heretofore, there have been a few attempts to provide a portable wheel load scale. However, these attempts have utilized conventional pivots and bearings and have not provided the accuracy generally required of a wheel load scale.

There is, therefore, a need for a new and improved wheel load scale which overcomes the foregoing and other disadvantages of the scales heretofore provided.

SUMMARY AND OBJECTS OF THE INVENTION

The present invention provides a compact, highly portable wheel load scale having a low profile and a high degree of accuracy. The base of the scale is a solid body formed to include an open cavity in which the entire lever system is mounted. Flexure plates are used in the lever system, and a hydraulic cylinder is utilized as an output transducer. This cylinder is formed as an integral part of the base. In one embodiment, the dialhead is located remotely of the base, and in another it is mounted in the base. Utilizing the techniques of the present invention, a wheel load scale having a capacity on the order of 20,000 pounds can be built in a package having an overall height on the order of 3¼ inches.

It is in general an object of the present invention to provide a new and improved wheel load scale.

Another object of the invention is to provide a scale of consists above character which utilizes flexure plates in its lever system.

Another object of the invention is to provide a scale of the above character which is compact and highly portable.

Another object of the invention is to provide a scale of the above character which has a low profile.

Another object of the invention is to provide a scale having better accuracy than wheel load scales heretofore provided.

Another object of the invention is to provide a scale of the above character which can use either a remote readout dial or a read out dial which is installed as integral part of the base of the scale.

Additional objects and features of the invention will be apparent from the following description in which the preferred embodiment is set forth in detail in conjunction with the accompanying drawings.

DESCRIPTION OF THE PREFERRED EMBODIMENT

Figure 1:
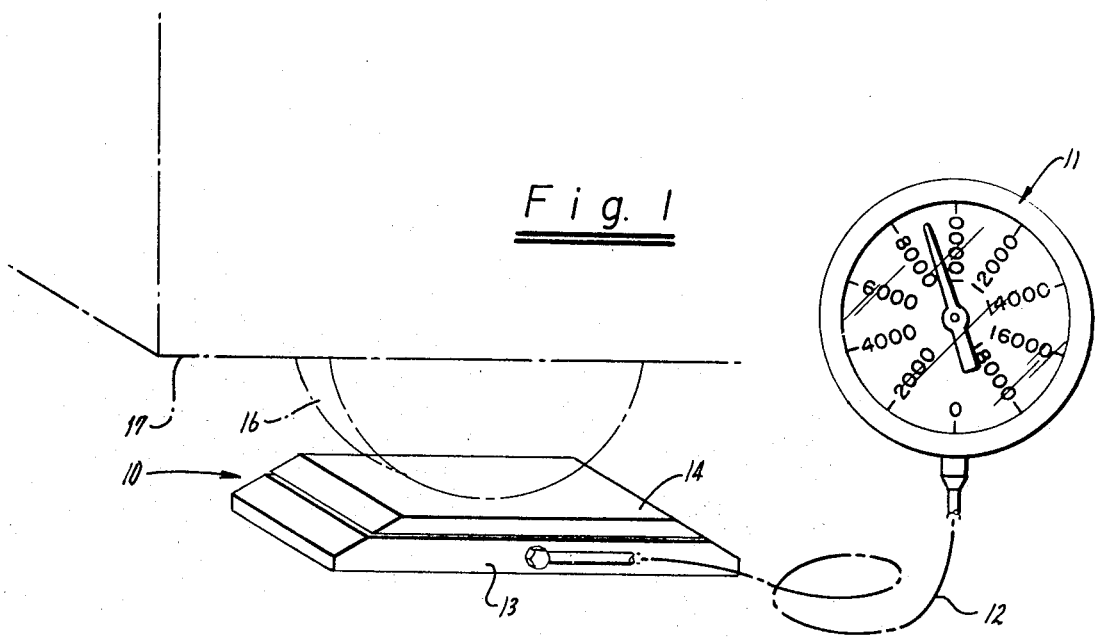
FIG. 1 is a perspective view of one embodiment of a wheel load scale incorporating the present invention.
Figure 5:
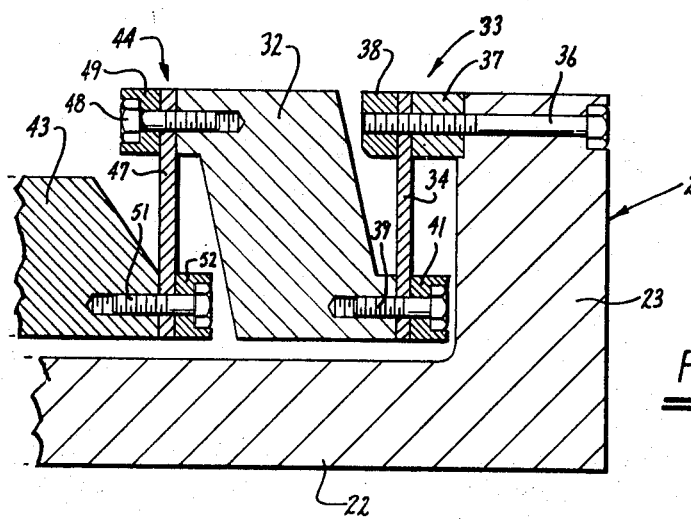
FIG. 5 is a sectional view taken along the line 5—5 of FIG. 4.
Figure 6:
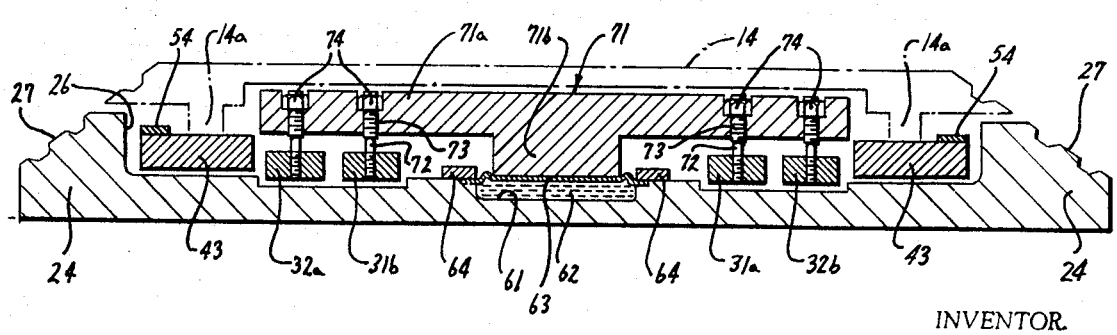
FIG. 6 is a sectional view taken along line 6—6 in FIG. 4.

As illustrated in FIG. 1, the wheel load scale includes a platform section 10 and a display system or dial head 11 connected to the platform section through a line 12. The platform section includes a base 13 adapted to rest upon a level surface and a horizontally disposed platform member 14 adapted for receiving the wheel of a vehicle such as a truck or an airplane. In FIG. 1, the wheel 16 of a truck having a body 17 is shown in phantom form on the platform.

The dial head 11 is of conventional design and can be located remotely of the platform section if desired. In the preferred embodiment, a hydraulic load cell is utilized in the platform section to produce a output signal proportional to the weight or load applied to the platform member. In this embodiment, the line 12 is a hydraulic line and the dial head includes a transducer for converting the hydraulic output signal to rotational movement to actuate a pointer 18.

Figure 2:
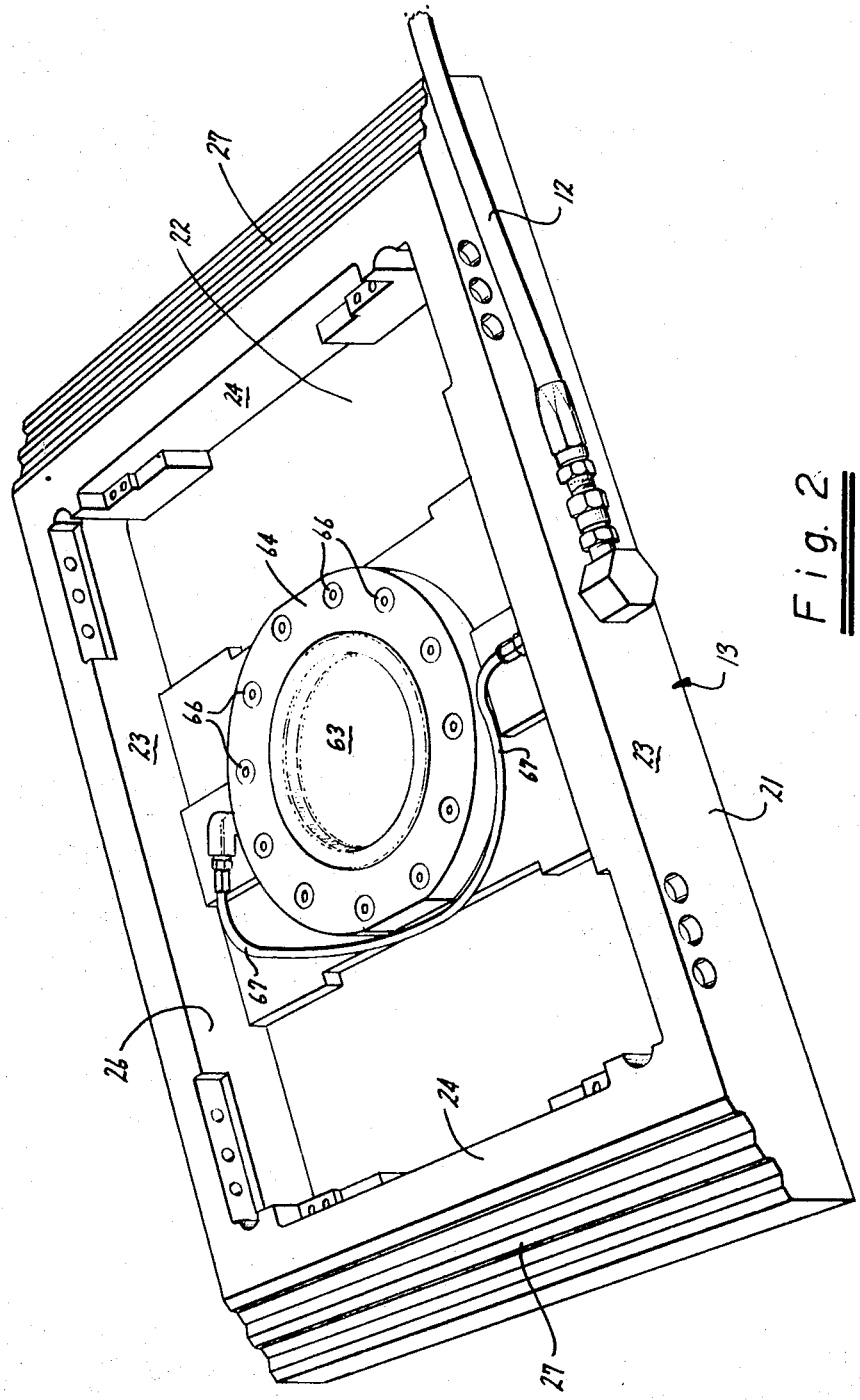
FIG. 2 is a perspective view of the base of the scale shown in FIG. 1.

As is most clearly illustrated in FIG. 2, the base 13 consists of a signal body member 21 which is formed to include a bottom wall portion 22, side wall portions 23, and end wall portions 24. These wall portions cooperate to define a cavity 26 in which the load cell and lever system of the scale are mounted in a manner hereinafter described. The end wall portions are formed to include inclined ramps 27 which serve to facilitate the movement of a wheel to and from the platform member. The base can be fabricated of a light weight material such as aluminum and can be formed by a conventional process such as casting.

Figure 3:
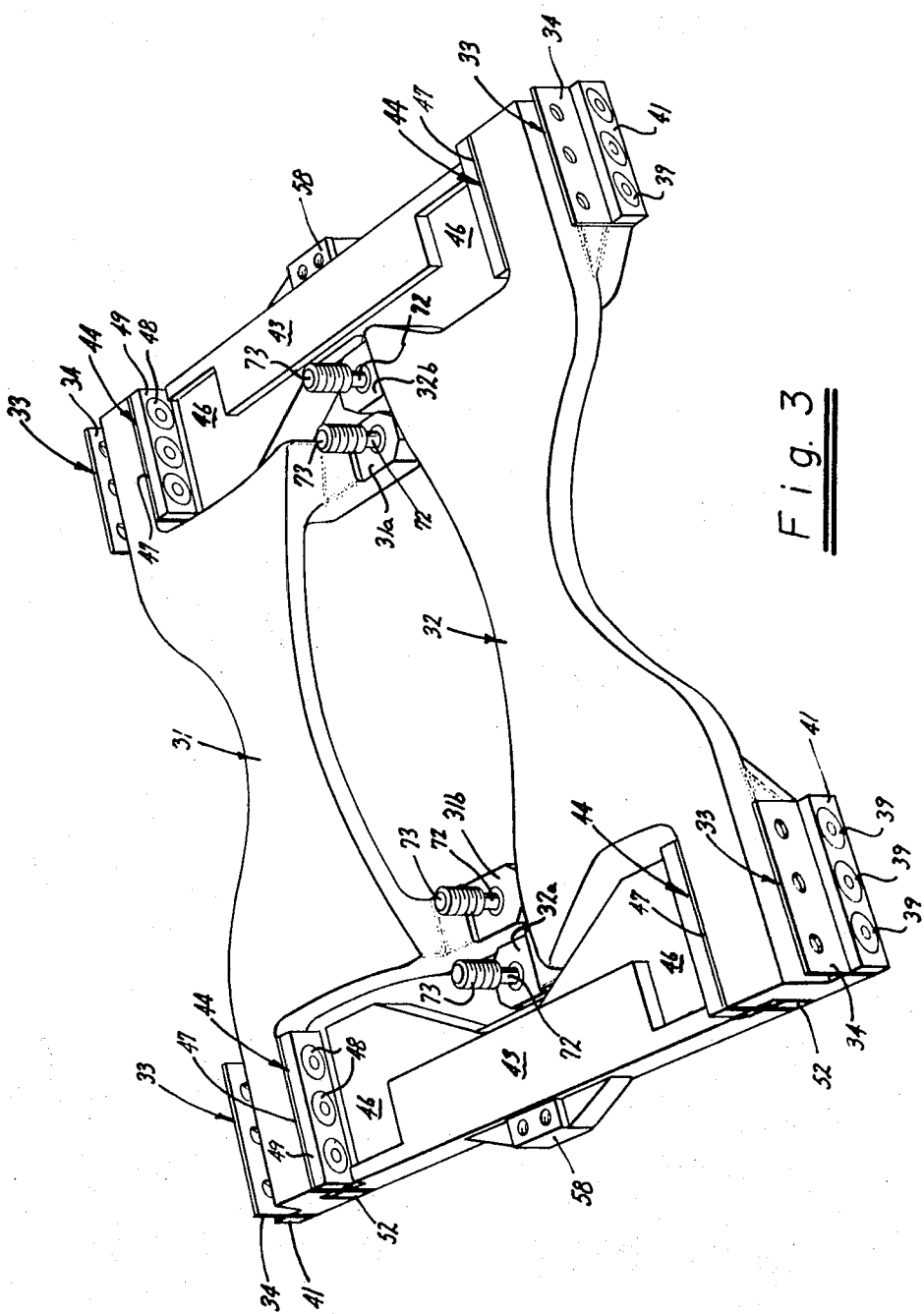
FIG. 3 is a perspective view of the lever system of the scale shown in FIG. 1.
Figure 4:
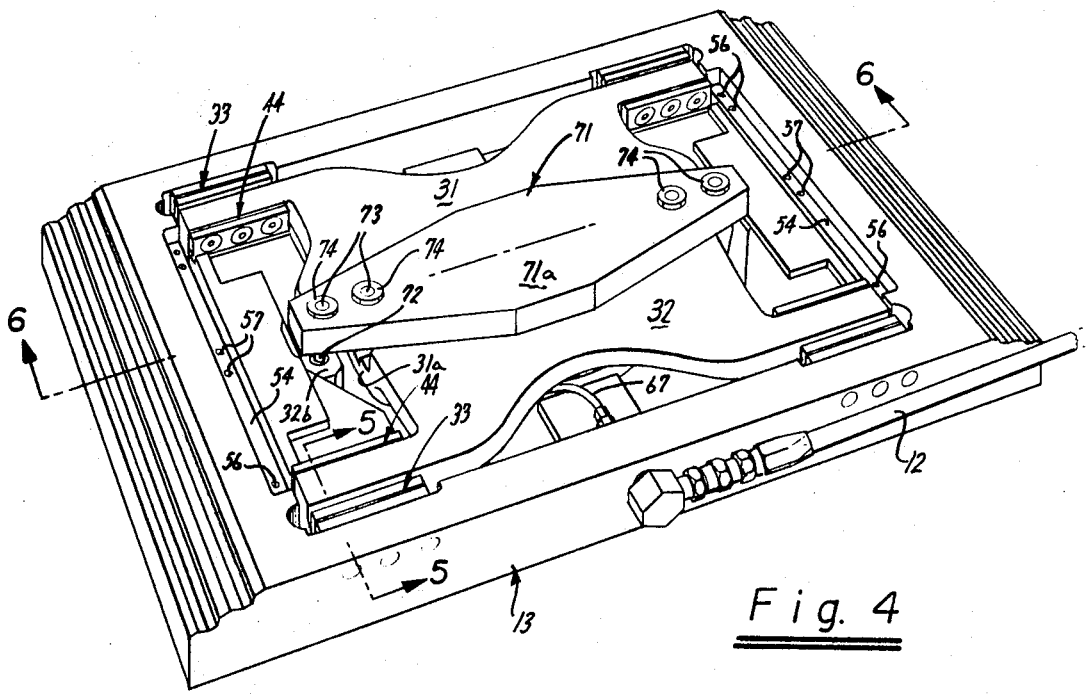
FIG. 4 is a perspective view of the scale shown in FIG. 1 with the platform member removed to illustrate the mounting of the lever system within the base.

The lever system of the scale as illustrated in FIG. 3 includes a pair of levers 31 and 32, each of which is mounted to one of the side wall portions 23 of the base by a pair of flexure assemblies 33. Each of these assemblies includes a generally rectangular flexure plate 34 fabricated of a flexible material such as a steel alloy. The upper portion of each flexure plate is secured to the base by means of bolts 36, a spacer block 37, and a clamping block 38. The lower portion of each flexure plate is secured to the lever by means of bolts 39 and a clamping block 41.

As can be seen from the drawings, the lever arms 31 and 32 are formed with irregular shapes and cutaway portions to provide clearance between the levers and other components in the base cavity 26. It will be noted, however, that each lever in effect includes two lever arms which extend normally from the flexure plates and which are constrained for movement together. The ends of the lever arms opposite the flexure plates are designated by the subscripts "a" and "b" in the drawings.

The platform member 14 is mounted directly above the base 13, and the load applied to the platform member is transferred to the levers 31 and 32 through load bridges 43 and flexure plate assemblies 44. The platform member includes downwardly extending supporting posts 14a which rest upon flat areas 46 on the load bridges. The ends of the platform member are bevelled to provide a continuation of the inclined ramps 27 of the base.

The flexure assemblies 44 each include a generally rectangular flexure plate 47 which is similar to the flexure plates 34. The upper portions of the plates 47 are secured to the levers 31 and 32 by bolts 48 and clamping blocks 49. The lower portions of these plates are secured to the load bridges by bolts 51 and clamping plates 52.

Check links 54 are provided to reduce the effects of side forces applied to scale and to prevent side motion of the platform member. Each of these check links is a flat elongate member which is attached at its ends to the base by bolts 56 and at its center by bolts 57 to a boss 58 formed on each load bridge.

Load cell means is included to provide an output signal proportional to the force or load applied to the platform member. In the preferred embodiment, this load cell comprises a hydraulic cylinder which is formed as an integral part of the base member. Thus, the base member is formed to include a generally cylindrical well 61 in which a suitable hydraulic fluid 62 is disposed. The well is enclosed by means of a diaphragm 63 which is held in place by an annular opening ring 64. This ring is secured to the bottom wall portion base member by means of bolts 66. The bottom wall portion of the base member is also formed to include two passageways, not shown, in fluid communication with the well 61. A hydraulic line 67 provides communication between one passageway and the output line 12. The other passageway provides a means of filling system with fluid and/or bleeding air from the hydraulic system. If desired, means can be included in the base member for regulating the temperature of the fluid in the system.

A load plate 71 is provided for transferring the load from the levers 31 and 32 to the load cell. This load plate includes a generally flat upper portion 71a and a downwardly extending piston 71b which engages the diaphragm 63 of the load cell. The upper portion 71a is connected to the output ends of the lever arms 31a, 31b, 32a and 32b by flexible cables 72. These cables are connected to the load plate by means of threaded studs 73 and nuts 74 which permit adjustments to be made in the angle of the levers. Alternatively, if desired, the load plate can be connected to the lever arms by rigid members, such as bolts or tie rods, rather than the flexible cables.

The cables 72 attached to the lever arm ends 31a and 31b are spaced from the center of the load cell by equal distances, as are the cables attached to the lever arm ends 32a and 32b. These equal spacings prevent load plate tipping and provide uniform readings regardless of where the load is placed on the platform member. The flexible cables and all of the flexure plates are disposed for flexing in the same general horizontal plane to prevent inaccuracies due to foreshortening of the effective lever arms.

Operation and use of the wheel load scale can now be described briefly. A load such as a wheel placed upon the platform member 14 exerts a downward force on the platform member and the load bridges 43. This force is applied to the levers 31 and 32 through the flexure assemblies 44, producing a corresponding downward force at the output ends 31a, 31b, 32a and 32b of the lever arms. This force is transmitted to the load plate 77 by the flexible cables 72. The piston portion 71b of the load plate exerts a pressure on the load cell proportional to the wheel load on the platform member. This pressure is displayed by the dial head 11 in units of weight, such as pounds.

Figure 7:
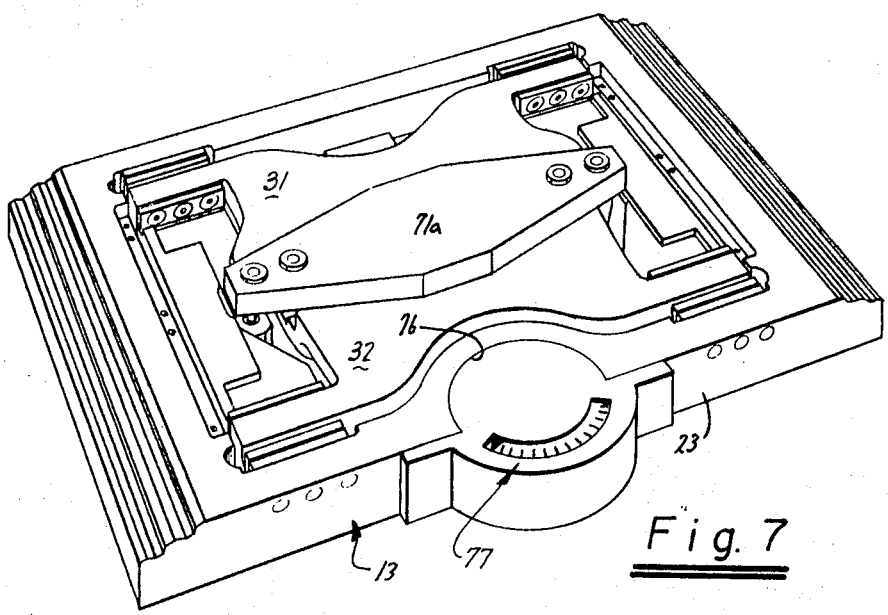
FIG. 7 is a perspective view of another embodiment of a wheel load scale incorporating the present invention wherein the readout dial is mounted in the base of the scale.

In the embodiment shown in FIG. 7, the side wall portion 23 of the base member is formed to include a cavity 76 in which a readout dial head 77 is mounted. This cavity is generally semicircular in shape and is bounded on one side by a curved wall portion which extends into a cutout region in the lever arm 32. The bottom of the cavity is generally planar, and the top and front of it are open. The dial head 77 is connected directly to the hydraulic line 67 and includes a conventional transducer for converting the hydraulic output signal from the load cell to mechanical movement to actuate a dial pointer. With the platform member 14 in place, the dial pointer is visible through the open front of the cavity 76. In operation and use, this embodiment is similar to that described hereinbefore.

Utilizing the techniques of the present invention, a wheel load scale having a capacity on the order of 20,000 pounds can be constructed in a unit having an overall height on the order of 3¼ inches, a length on the order of 21 inches, and a width on the order of 13 inches.

It is apparent from the foregoing that a new and improved wheel load scale has been provided. This scale utilizes flexures, exclusively, in the lever system, is compact in size, rugged in construction, and highly portable. In addition, it provides an accuracy on the order of 0.1 percent. While only the presently preferred embodiment has been described, as will be apparent to those familiar with the art, certain changes and modifications can be made without departing from the scope of the invention as defined by the following claims.

We claim:

1. In a scale for measuring loads carried by the wheels of vehicles, a base adapted to rest on a planar surface, said base being formed to include end, side and bottom walls defining a cavity, a pair of levers disposed within said cavity, each of said levers having a pivot head portion and spaced apart arms extending therefrom, fulcrum flexure plates mounting the pivot head portions of said levers to the side walls of said base, a horizontally disposed platform adapted for receiving the wheel of a vehicle on its upper surface, means including load flexure plates connecting said platform to the pivot head portions of said levers, said load flexure plates being spaced apart from and generally parallel to said fulcrum plates, load cell means disposed in said cavity, and means connecting the lever arms to said load cell means in such manner that said load cell means produces an output signal corresponding to the load applied to the platform by the wheel of the vehicle.

2. A scale as in claim 1 wherein said load cell means includes a hydraulic cylinder, said cylinder being formed as an integral part of the bottom wall means of said base.

3. A scale as in claim 2 wherein the means connecting the lever arms to said load cell means includes a load plate having a piston portion movably disposed relative to said hydraulic cylinder and flexible cable means connecting said load plate to the lever arms.

4. A scale as in claim 1 wherein said base consists of a single member including said end, side and bottom walls.

5. A scale as in claim 4 wherein the base member is formed to include an inclined ramp serving to facilitate rolling movement of said wheel to and from the upper surface of said platform.

6. A scale as in claim 1 further including means responsive to said output signal for displaying the load applied to the platform by the wheel.

7. A scale as in claim 6 wherein the means for displaying the load is located remotely of the base of the scale.

8. A scale as in claim 6 wherein the means for displaying the load is mounted in the base of the scale.

9. A scale as in claim 1 wherein the means connecting the lever arms to the load cell means includes flexible cables.

10. In a scale for weighing loads carried by the wheels of vehicles, a base having end, side and bottom walls defining a cavity, a platform surmounting said base, said base having an inclined ramp portion to facilitate rolling movement of a wheel onto said platform, a pair of levers disposed in said cavity, each of said levers having a pivot head portion and spaced apart arms extending therefrom, vertically extending fulcrum flexure plates connecting the pivot head portions to the side walls of said base, rigid load bridge members disposed for receiving loads applied to said platform, said members extending between the pivot head portions of said levers, vertically extending load flexure plates connecting the end portions of said bridge members to said pivot head portions, said load flexure plates being spaced apart from and generally parallel to said fulcrum flexure plates, output transducer means disposed in said cavity for producing an output signal corresponding to the force applied thereto, and means for transferring forces from the lever arms to said transducer means, the points at which the forces are transferred from the arms of each lever being equidistant from the point at which the forces are applied to said transducer means.

* * * * *